(12) United States Patent
Yacoub

(10) Patent No.: US 9,109,496 B2
(45) Date of Patent: Aug. 18, 2015

(54) SYSTEM AND METHOD FOR A MOVABLE EXHAUST AFTERTREATMENT DEVICE IN AN INTERNAL COMBUSTION ENGINE

(71) Applicant: Ford Global Technologies, LLC, Dearborn, MI (US)

(72) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/304,734

(22) Filed: Jun. 13, 2014

(65) Prior Publication Data

US 2014/0366506 A1    Dec. 18, 2014

(30) Foreign Application Priority Data

Jun. 17, 2013    (DE) .......................... 10 2013 211 293

(51) Int. Cl.
*F01N 3/00*   (2006.01)
*F01N 13/10*  (2010.01)
*F01N 9/00*   (2006.01)
*F02B 37/22*  (2006.01)
*F01N 3/022*  (2006.01)
*F01N 3/08*   (2006.01)
*F01N 3/10*   (2006.01)

(52) U.S. Cl.
CPC ............... *F01N 13/10* (2013.01); *F01N 3/022* (2013.01); *F01N 9/00* (2013.01); *F02B 37/22* (2013.01); *B01D 2275/302* (2013.01); *F01N 3/0842* (2013.01); *F01N 3/106* (2013.01); *F01N 2260/14* (2013.01); *F01N 2560/025* (2013.01); *F01N 2900/08* (2013.01)

(58) Field of Classification Search
CPC ........... F01N 13/10; F01N 9/00; F01N 3/022; F02B 7/22
USPC ............................................. 60/273, 274, 323
See application file for complete search history.

(56) References Cited

U.S. PATENT DOCUMENTS

| | | | |
|---|---|---|---|
| 4,718,926 A | 1/1988 | Nakamoto et al. | |
| 5,000,768 A | 3/1991 | Hwang | |
| 7,273,514 B2 | 9/2007 | Bailey et al. | |
| 2002/0157384 A1* | 10/2002 | Hirota et al. | 60/295 |
| 2004/0231323 A1* | 11/2004 | Fujita et al. | 60/284 |
| 2006/0059899 A1 | 3/2006 | Bailey | |
| 2009/0007546 A1* | 1/2009 | Ueda et al. | 60/286 |
| 2010/0275585 A1 | 11/2010 | Burkhardt | |
| 2011/0017064 A1 | 1/2011 | Zhang | |
| 2011/0146250 A1* | 6/2011 | Vanvolsem et al. | 60/297 |

FOREIGN PATENT DOCUMENTS

| | | |
|---|---|---|
| DE | 3235953 A1 | 3/1984 |
| DE | 9320917 U1 | 5/1995 |

(Continued)

*Primary Examiner* — Thomas Denion
*Assistant Examiner* — Jason Shanske
(74) *Attorney, Agent, or Firm* — Julia Voutyras; Alleman Hall McCoy Russell & Tuttle LLP

(57) ABSTRACT

The present application relates to an exhaust-gas aftertreatment device and to a method for exhaust-gas aftertreatment. According to one aspect of the present application, the exhaust-gas aftertreatment device has, in the exhaust manifold of the internal combustion engine, a filter passage with, for the exhaust-gas stream, a through-path that is variably adjustable over time during the operation of the exhaust-gas aftertreatment device.

15 Claims, 3 Drawing Sheets

(56) References Cited

FOREIGN PATENT DOCUMENTS

| DE | 10212236 A1 | 2/2003 |
| DE | 202004002951 U1 | 8/2004 |
| DE | 102009033379 A1 | 1/2011 |
| DE | 102010026868 A1 | 2/2011 |
| EP | 1270884 A1 | 1/2003 |
| EP | 2105596 A2 | 9/2009 |
| EP | 2405109 A2 | 1/2012 |
| JP | 2000080912 A | 3/2000 |

* cited by examiner

SYSTEM AND METHOD FOR A MOVABLE EXHAUST AFTERTREATMENT DEVICE IN AN INTERNAL COMBUSTION ENGINE

CROSS REFERENCE TO RELATED APPLICATIONS

The present application claims priority to German Patent Application No. 102013211293.9, filed Jun. 17, 2013, the entire contents of which are hereby incorporated by reference for all purposes.

BACKGROUND\SUMMARY

An internal combustion engine may be operated to vary a lambda value based on requested operating conditions. A low lambda value corresponds to a rich operation, wherein a rich operation is used for the release and conversion of trapped NOx in aftertreatment devices as well as for release of sulfur at relatively lower bed temperatures. The transition of the lambda value to a lower value, i.e. a transition from lean to rich operation, leads to higher wet soot production. This wet soot may be deposited on the exhaust-gas components downstream of the exhaust manifold, such as the turbocharger rotor shaft, degrading their operating characteristics and performance.

One approach to reduce soot deposits on exhaust-gas components is shown by Linder et al. in DE 3235953 A1. Therein, a filter is positioned close to the exhaust side of the internal combustion engine. A bypass line and bypass valve are connected to the filter. At a full-load operation, the bypass line is closed via the bypass valve and the exhaust gas is passed through the filter. At other load conditions, the bypass line is opened via the bypass valve and the exhaust gas is passed through the bypass line, bypassing the filter. Another approach is shown by Gudorf et al. in EP 2105596 A2. Therein, a filter is positioned upstream of the turbocharger turbine. Here, the exhaust flows through the filter during operation of the internal combustion engine.

A potential issue noted by the inventors with the above approach of Linder et al. is that the filter is engaged only at full load. Therefore, soot may still pass to the downstream components during other engine operating conditions. Another potential issue noted by the inventors with the approach of Gudorf et al. is that no flow control is provided. The exhaust flow must pass through the filter, and airflow to the turbocharger turbine may be decreased during engine operation.

One potential approach to at least partially address some of the above issues includes an exhaust aftertreatment device positioned in an exhaust manifold of an exhaust system of an internal combustion engine. The exhaust aftertreatment device comprises a filter passage formed by a first filter element and a second filter element which form a through-path that is variably adjustable in response to a lambda value. The filter passage filtration walls are adjustable in terms of their relative spacing with respect to one another. Thus, the exhaust flow is filtered upstream of other exhaust gas components and the exhaust flow passage volume is controllable based on an engine operating condition.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
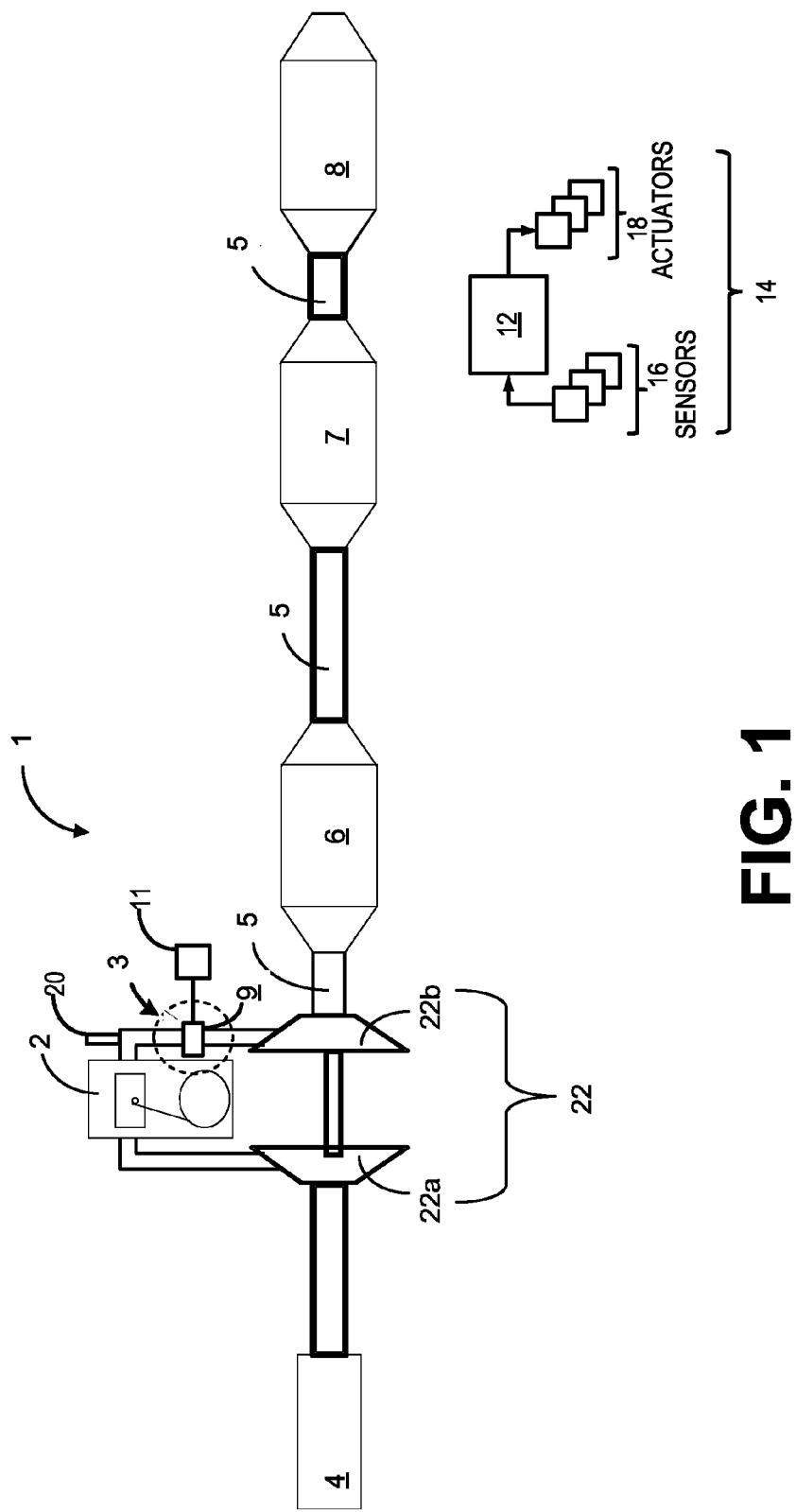
FIG. 1 is a schematic illustration for an exhaust-gas system

The present application relates to an exhaust-gas aftertreatment device and to a method for exhaust-gas aftertreatment.

In motor vehicles having a diesel engine, the exhaust-gas aftertreatment device of which is equipped with a NOx storage catalytic converter, operation with a rich air-fuel mixture is performed in certain operating phases. In this case, a relatively low target value for the lambda value (for example 0.96) is set, such as is considered for the release and conversion of nitrogen oxides (NOx) stored in the NOx storage catalytic converter and also for the release of sulfur at relatively low catalytic converter temperatures (typically 600° C.-700° C.).

In low-load operation, the possibility of realizing stable operation with a rich air-fuel mixture is limited by the stability of the combustion process. This is the case, for example, in combustion concepts which are based on a lean air-fuel mixture, such as used in diesel engines with direct injection. As a result, the robustness considered for achieving low total hydrocarbon (THC) emissions is restricted. During operation at low to medium load and at a constant engine speed, the stability of the rich air-fuel mixture is also a function of the uniformity of the torque demand by the driver (that is to say the accelerator pedal actuation), which in turn may vary in a manner dependent on the roadway, for example when driving on an uphill or downhill gradient. Furthermore, during operation at medium to high load (typically in the event of temporary acceleration or continuous operation at relatively high power), the possibility of setting and maintaining operation with a rich air-fuel mixture is restricted by the threshold values for the exhaust-gas temperatures at the turbocharger and in the exhaust-gas recirculation circuit (EGR circuit).

A potential issue that arises in practice is the pronounced formation of wet soot, which is caused by the transition from lean to rich operation and the low lambda value at the start of the cleaning process. Said wet soot can be deposited on the exhaust-gas components downstream of the diesel particle filter (DPF) and, to a certain extent, can for example also adhere, as deposits, to the turbine of the turbocharger, whereby operating characteristics and performance of the exhaust gas aftertreatment device may be impaired.

DE 10 2010 026 868 A1 discloses inter alia a soot filter which has oblique corrugated layers with parallel ridges in order to improve the retention of particles, it also being possible for the soot filter to be configured such that the hydraulic surface for the exhaust-gas stream varies as a function of the traveling distance through the soot filter, or from the inlet to the outlet.

EP 0 205 755 B1 discloses inter alia an exhaust-gas filter for a diesel engine, which exhaust-gas filter has one corrugated web and one flat web which are each composed of porous ceramic material and which together form a composite web which is coiled to form a honeycomb structure with cell ducts, with tubular inserts having relatively small openings being inserted into the ducts.

WO 2009/065572 A1 discloses inter alia a soot particle filter in which the soot particles are deposited on high-temperature-resistant high-grade metal plates, wherein spontaneous combustion of the stored soot particles can be initiated for example by means of glow ignition.

Further reference is made for example to US 2006/0059899 A1 and EP 2 405 109 A2.

It is an object of the present application to provide an exhaust-gas aftertreatment device and a method for exhaust-gas aftertreatment which make it possible to generate stable operation with a rich air-fuel mixture while avoiding the potential issues described above.

Said object is achieved by means of the features of the independent claims.

An exhaust-gas aftertreatment device for an internal combustion engine has, in the exhaust manifold of the internal combustion engine, a filter passage with, for the exhaust-gas stream, a through-path that is variably adjustable over time during the operation of the exhaust-gas aftertreatment device.

The present application is based in particular on the concept of assisting operation with a rich air-fuel mixture by providing, in the exhaust manifold of the internal combustion engine, a filter passage with a through-path spacing that is variably adjustable over time during the operation of the exhaust-gas aftertreatment device, such that wet soot that is generated during operation with a rich air-fuel mixture may be at least partially captured, whereas, in the "normal" operating mode (that is to say during operation with a stoichiometric or lean air-fuel mixture), the filter passage may be set so as to have a relatively large through-path, such that, in the "normal" operating mode, the exhaust-gas stream is then impeded to a lesser extent or not at all. The method allows for filtering of the exhaust-gas stream at various engine operating conditions while providing a varying amount of filtration responsive to a lambda value over a threshold.

In one embodiment, the internal combustion engine has a turbocharger with a compressor and a turbine, the filter passage being arranged upstream of the turbine with respect to the exhaust-gas stream. Owing to this arrangement of the filter passage upstream of the turbine, it is possible for wet soot that is generated during the operation of the internal combustion engine and of the exhaust-gas aftertreatment device to be at least partially captured and keep from reaching the turbine of the turbocharger and adhering, as deposits, to the latter.

In one embodiment, the exhaust-gas aftertreatment device also has a control device which is configured to vary the through-path of the filter passage as a function of a lambda value, set in the operation of the internal combustion engine, of the air-fuel mixture.

In one embodiment, in the case of said variation, the through-path of the filter passage is reduced in the event of a decrease in the lambda value of the air-fuel mixture. Reducing the filter passage through-path spacing thus constricts the cross-sectional area of the exhaust gas flow in the exhaust gas system.

In one embodiment, the filter passage, in at least one setting, does not influence the exhaust-gas stream.

In one embodiment, the filter passage has filtration walls that may be movable in terms of their relative spacing with respect to one another.

In one embodiment, the filter passage has a lamellar structure at least in regions.

The present application also relates to a method for exhaust-gas aftertreatment, having an exhaust-gas aftertreatment device which has a filter passage with, for the exhaust-gas stream, a through-path that is variably adjustable over time during the operation of the exhaust-gas aftertreatment device. Here, the through-path is varied as a function of a lambda value, set in the operation of the internal combustion engine, of the air-fuel mixture. The through-path may be varied in a continuous fashion or a staged fashion.

In one embodiment, to clean the filter passage, a temporary period of high-temperature operation is implemented.

With regard to further preferred refinements of the method, reference is made to the above statements in conjunction with the exhaust-gas aftertreatment device according to the present application.

Further embodiments of the present application may be gathered from the description and from the subclaims.

The present application will be explained in more detail below on the basis of exemplary embodiments and with reference to the appended FIGS.

FIG. 1 is a schematic illustration for explaining the construction of an exhaust-gas aftertreatment device 3 comprising a filter passage 9 in an exhaust-gas system 1 of a vehicle.

In FIG. 1, an internal combustion engine 2, for example a diesel engine, with turbocharger 22 draws in fresh air from an air filter 4, said fresh air being pre-compressed by a compressor 22a of the turbocharger 22. In the exhaust line 5 downstream of the turbine 22b of the turbocharger 22, the exhaust gases, of the internal combustion engine 2, flow in succession through an oxidation catalytic converter and/or a NOx storage catalytic converter 6, a diesel particle filter 7, and a rear silencer 8.

A control system 14 may include sensors 16 that send signals to controller 12. Further, controller 12 may be a computer with readable instructions stored on non-transitory memory. The controller 12 may receive input data from the sensors 16 and trigger the actuators 18 in response to the processed input data based on instruction or code programmed therein corresponding to one or more routines to control operation of engine 2 as well as components of the intake and exhaust system. An example control routine is described herein with regard to FIG. 3, which may be stored as instructions in memory of the controller.

A filter passage 9 is provided in the exhaust-gas aftertreatment device 3 in the exhaust manifold upstream of the turbine 22b of the turbocharger 22. An oxygen sensor 20 is provided upstream of the filter passage 9. The oxygen sensor may be a universal exhaust gas oxygen (UEGO) sensor, a heated exhaust gas oxygen (HEGO) sensor or a two-state exhaust gas oxygen sensor, for example. Further, the exhaust system may include more oxygen sensors positioned in the exhaust line 5. The filter passage 9, as will be described in more detail with reference to FIG. 2, may be variably movable over time during the operation of the exhaust-gas aftertreatment device 3.

Figure 3:
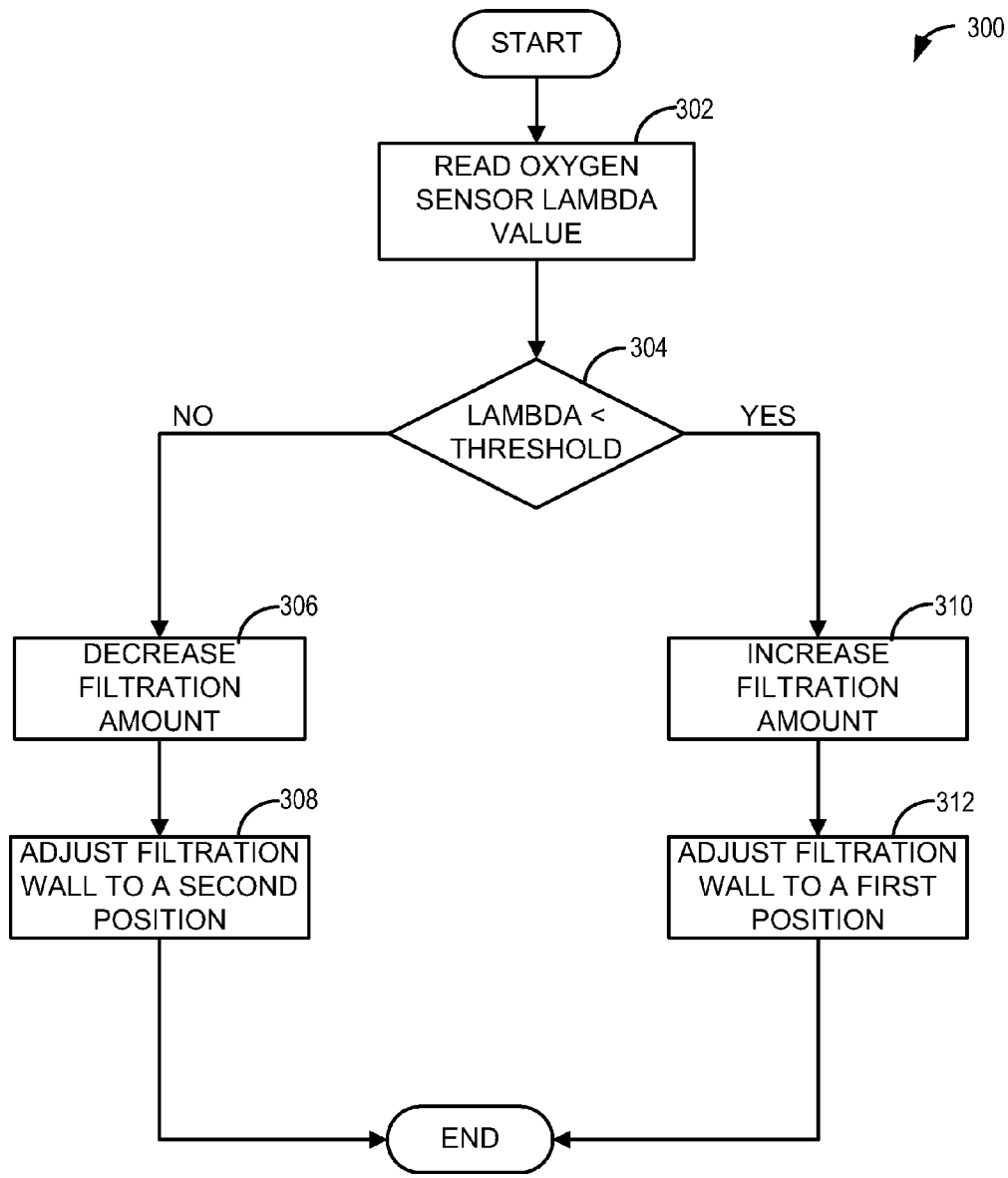
FIG. 3 is a flow chart illustrating filter passage through-path adjustments.

Here, it is preferable for a control device 11 to be provided which is configured to vary the through-path of the filter passage 9 as a function of a lambda value, set in the operation of the internal combustion engine 2, of the air-fuel mixture. An example method is shown in FIG. 3 for adjusting the filter passage 9 via the control device 11, which may be connected with controller 12 in a data-transmitting manner. The control device may be an actuator coupled to an electronic controller, for example.

Figure 2A:
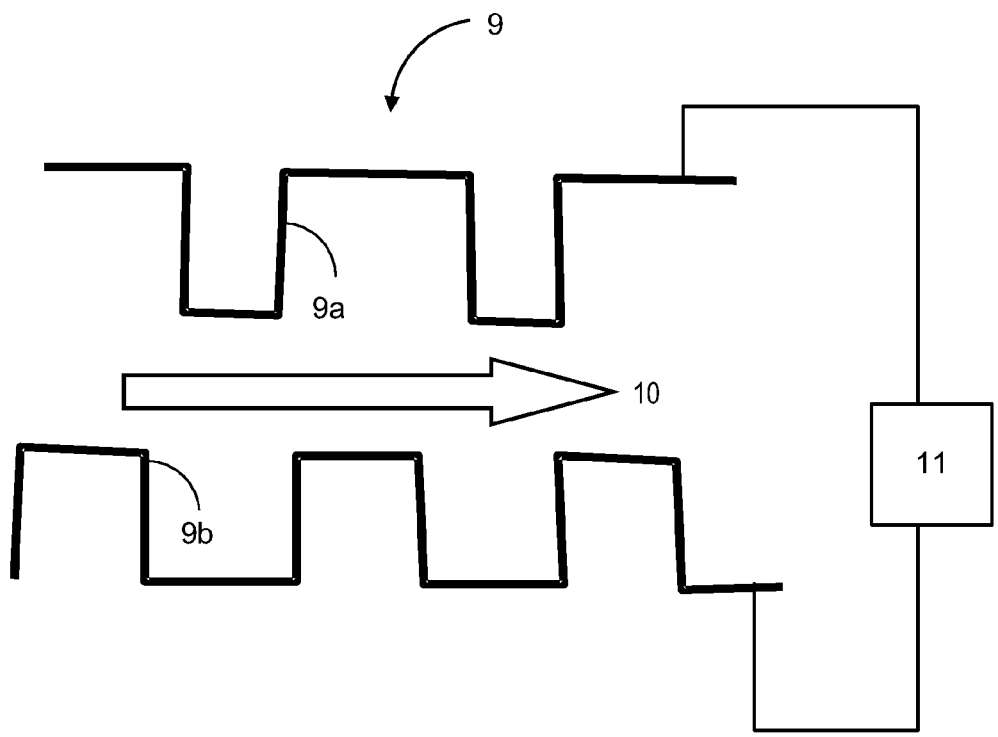
FIGS. 2A and 2B are schematic illustrations for the function of a filter passage provided in an exhaust-gas system.

By means of said control device 11, the filter passage 9 may, in the "normal" operating mode (that is to say during operation with a stoichiometric or lean air-fuel mixture), be set "open" as schematically indicated in FIG. 2A, that is to say, in said position, the exhaust-gas stream 10 is not restricted or impeded. In one example, the control device may be connected with a first filtration wall 9a and a second filtration wall 9b, as shown in FIG. 2A. Therein, the control device 11 may move both of the first and second filtration walls relative to one another to control the filter passage opening. Moving the first filtration wall 9a and second filtration wall 9b away from each other, i.e. increase the through-path, decreases the filtration amount. In another example, the control device 11 may be connected to the first filtration wall 9a and the second filtration wall 9b may be stationary. Therein, the first filtration wall may be moved to increase or decrease the through-path of the filter passage 9.

Figure 2B:
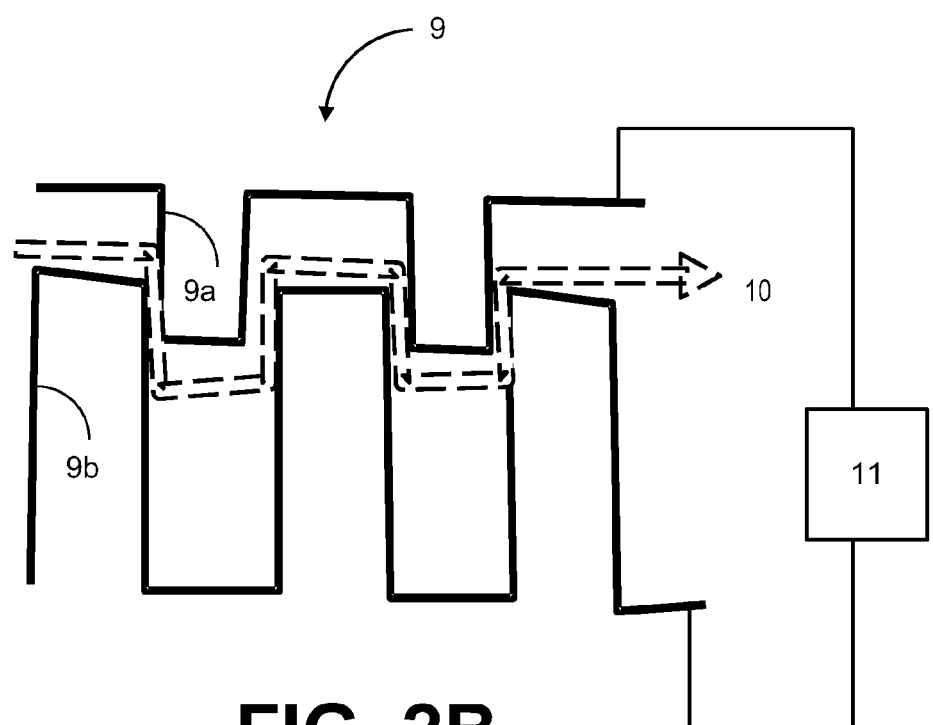

However, during operation of the internal combustion engine 2 with a rich air-fuel mixture, the filter passage 9 is closed or constricted, as schematically indicated in FIG. 2B, to such an extent as to yield a through-path constriction for the hot exhaust-gas stream or the rich air-fuel mixture. Here, the exhaust-gas stream 10 contacts the filtration walls 9a, 9b. In one example, the first filtration wall 9a is adjusted towards the second filtration wall 9b while the second filtration wall 9b is simultaneously adjusted towards the first filtration wall 9a, thereby decreasing the through-path and increasing the filtration amount. Here, for example, the filter passage 9 has a lamellar structure, which forms filtration walls 9a, 9b, on which, in particular, wet soot can be deposited. Owing to the constricted through-path cross section in the region of the filter passage 9, the wet soot that is generated is at least partially captured and kept from reaching the turbine 22b of the turbocharger 22 and adhering thereto in the form of deposits.

The elevated back pressure furthermore makes it possible for the mass flow rate in the exhaust-gas aftertreatment device 3 to be reduced, which is desirable because, in this way, the amount of additional fuel for generating the rich air-fuel mixture may be reduced.

The deposited soot particles can then be eliminated during the normal regeneration of the diesel particle filter 7. It is also possible for cleaning of the filter passage 9 to be effected by means of a brief period of high-temperature operation.

Turning now to FIG. 3, an example method 300 is shown for moving a filtration wall to increase or decrease a through-path of a filter passage responsive to a lambda value over a threshold. In one example, the filtration amount may be increased when the engine is in a rich mode and the filtration walls adjusted to provide a minimum threshold opening. In another example, the method may decrease the filtration amount when the engine is in a lean mode and adjust the walls to provide a maximum threshold opening. Further, the walls may be adjusted to provide a filtration amount between the two examples listed above.

At 302, the method may read the oxygen sensor lambda value. For example, the oxygen sensor positioned upstream of the filter may be read to determine the lambda value. In another example, an oxygen sensor positioned in the exhaust passageway downstream of the turbine may be read. Further, multiple oxygen sensor values may be read, in yet another example.

At 304, the method may determine if the lambda value is less than a threshold value. The threshold value may be set to indicate a lean to rich switch. In one example, a lambda value below a threshold value indicates a low air-fuel ratio, i.e. the engine is running rich. If the lambda value is not below a threshold value, the engine is running lean and the method may proceed to 306 and decrease the filtration amount. Here, at 308, the filtration wall may be adjusted to a second position, which may not restrict airflow. For example, during lean operation, the engine may not produce wet soot which may interfere with the operation of downstream exhaust gas components. Thus, the filtration walls may be adjusted to provide a large through-path in the filter passageway and set the filtration amount to a minimum threshold amount. For example, the filtration wall positions as illustrated in FIG. 2A. The exhaust-gas stream therefore receives minimal filtration. The method may then end.

At 304, if the lambda value is below a threshold, the method may proceed to 310 and increase the filtration amount. For example, during rich excursions which may have a lambda value below the threshold, an increase in wet soot production may occur. The wet soot may adhere to components in the exhaust-gas system and interfere with their operation. Increasing the filtration amount reduces the wet soot amount, and reduces issues with soot adherence on exhaust-gas system components. Here, the exhaust flow may be constricted in the through-path spacing which increases the filtration amount. At 312, the filtration walls may be adjusted to a first position, wherein the first position provides a greater filtration amount by narrowing the through-path of the filter passage than the second position of the filtration walls. For example, the filtration wall positions as illustrated in FIG. 2B. The first position may set the filtration amount to a maximum threshold amount. The method may then end.

Method 300 is an example to adjust the filtration amount provided by a through-path spacing of a filter with at least one movable wall based on a threshold lambda value. In another example, a first threshold and second threshold lambda value may be used to allow for a first, second and third position of the filtration walls. Thus, the filtration amount may be set to optimize the reduction of wet soot particles in the exhaust-gas stream.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust-gas aftertreatment device for an internal combustion engine, wherein the exhaust-gas aftertreatment device, in an exhaust manifold of the internal combustion engine, has a filter passage with, for an exhaust-gas stream, a through-path that is variably adjustable over time during the operation of the exhaust-gas aftertreatment device; and the filter passage has a first filtration wall and a second filtration wall which are adjustable in terms of their relative spacing with respect to one another.

2. The exhaust-gas aftertreatment device as claimed in claim 1, wherein the internal combustion engine has a turbocharger with a compressor and a turbine, the filter passage being arranged upstream of the turbine with respect to the exhaust-gas stream.

3. The exhaust-gas aftertreatment device as claimed in claim 1, wherein the exhaust-gas aftertreatment device further comprises a control device which is configured to vary the through-path of the filter passage as a function of a lambda value, set in the operation of the internal combustion engine, of the air-fuel mixture.

4. The exhaust-gas aftertreatment device as claimed in claim 3, wherein the through-path of the filter passage is reduced in the event of a decrease in the lambda value of the air-fuel mixture.

5. The exhaust-gas aftertreatment device as claimed in claim 3, wherein the filter passage, in at least one setting, does not influence the exhaust-gas stream.

6. The exhaust-gas aftertreatment device as claimed claim 1, wherein the filter passage has a lamellar structure at least in regions.

7. A method, comprising:

adjusting a through-path spacing of a filter passage of an exhaust aftertreatment device positioned in an exhaust manifold to vary a filtration amount of an exhaust-gas stream in response to a lambda value over a threshold.

8. The method as claimed in claim 7, wherein the through-path is adjusted to decrease the filtration amount of the exhaust-gas stream when the lambda value is above the threshold.

9. The method as claimed in claim 7, wherein the through-path is adjusted to increase the filtration amount of the exhaust-gas stream when the lambda value is below the threshold.

10. A method, comprising:

moving a filtration wall of a filter passage of an aftertreatment device to a first position in response to a lambda value below a first threshold; and moving the filtration wall to a second position in response to the lambda value above a second threshold.

11. The method as claimed in claim 10, wherein the first threshold and second threshold are equal.

12. The method as claimed in claim 10, wherein the first position provides a greater filtration amount than the second position.

13. The method as claimed in claim 10, wherein the first position constricts a cross-sectional area of the exhaust-gas stream.

14. The method as claimed in claim 10, wherein the first filtration wall and the second filtration wall are movable relative to each other.

15. The method as claimed in claim 10, wherein the first filtration wall is movable relative to the second filtration wall wherein the first filtration wall is movable and the second filtration wall is stationary.

* * * * *